United States Patent
Grack et al.

(10) Patent No.: US 7,958,094 B2
(45) Date of Patent: Jun. 7, 2011

(54) MANAGEMENT OF DELETION REQUESTS FOR RELATED DOCUMENTS IN A CONTENT MANAGEMENT SYSTEM

(75) Inventors: Daniel Edward Grack, Fountain Valley, CA (US); Lauren Anne Mayes, Laguna Beach, CA (US); Bao Quoc Vu, Mission Viejo, CA (US); Li Zhou, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/145,814

(22) Filed: Jun. 25, 2008

(65) Prior Publication Data
US 2009/0327262 A1    Dec. 31, 2009

(51) Int. Cl.
*G06F 7/00* (2006.01)
*G06F 17/30* (2006.01)

(52) U.S. Cl. ................. 707/662; 707/692; 707/754
(58) Field of Classification Search ............. 707/662, 707/692, 707, 754, 821
See application file for complete search history.

(56) References Cited

U.S. PATENT DOCUMENTS

| | | | |
|---|---|---|---|
| 6,601,063 B2* | 7/2003 | Koo et al. ........................ 1/1 |
| 6,618,727 B1* | 9/2003 | Wheeler et al. .............. 707/748 |
| 7,401,094 B1* | 7/2008 | Kesler ........................... 707/805 |
| 7,650,358 B2* | 1/2010 | Dinh et al. ............. 707/999.102 |
| 7,664,790 B2* | 2/2010 | Blaicher et al. ........ 707/999.202 |
| 7,747,621 B2* | 6/2010 | Sato et al. ..................... 707/736 |
| 7,877,425 B2* | 1/2011 | Yasoshima ................... 707/829 |
| 2002/0004710 A1* | 1/2002 | Murao .......................... 702/167 |
| 2005/0060375 A1 | 3/2005 | Ernest et al. |
| 2005/0076094 A1* | 4/2005 | Sasaki et al. .................. 709/217 |
| 2005/0102361 A1 | 5/2005 | Winjum et al. |
| 2006/0031309 A1 | 2/2006 | Luoffo et al. |
| 2006/0036696 A1* | 2/2006 | Maresh ......................... 709/206 |
| 2006/0095527 A1 | 5/2006 | Malik |
| 2006/0161518 A1* | 7/2006 | Lacapra ............................. 707/2 |
| 2007/0130369 A1 | 6/2007 | Nayak |
| 2007/0174394 A1 | 7/2007 | Jayaweera |
| 2007/0260618 A1* | 11/2007 | Kawate et al. ................ 707/100 |
| 2007/0260971 A1* | 11/2007 | Rivas et al. ................... 715/511 |
| 2007/0299882 A1 | 12/2007 | Padgett et al. |
| 2008/0020735 A1 | 1/2008 | Bumiller |
| 2008/0177775 A1* | 7/2008 | Kawate et al. ................ 707/102 |

* cited by examiner

*Primary Examiner* — Don Wong
*Assistant Examiner* — Merilyn P Nguyen
(74) *Attorney, Agent, or Firm* — Elissa Wang; SVL; IP Law

(57) ABSTRACT

A method and system for the management of deletion requests for related documents in a content management system. When a user requests to delete a related document associated with a record in the content management system, the request determines whether there are other documents associated with the record, collects the documents and determines if any of the collected documents are parent documents, removes the association between each collected document and the record, and initiates a deletion process to delete the parent documents.

23 Claims, 4 Drawing Sheets

MANAGEMENT OF DELETION REQUESTS FOR RELATED DOCUMENTS IN A CONTENT MANAGEMENT SYSTEM

BACKGROUND

1. Technical Field

The present invention relates generally to a content management system, and more particularly to systems and methods for the management and deletion of related documents in a content management system.

2. Discussion of Related Art

A content management system is a system that can typically manage all types of electronic data objects including, for example, HTML and XML Web content, document images, office documents, e-mail messages, SMS messages, textual data, printed output, audio, video, and other digital representations of information (collectively referred to herein as "documents").

Conventional content management systems typically include a client access Application Program Interface (API), a library server, and one or more resource managers. The library server stores metadata relating to all documents stored in the resource manager, and also controls the particular documents that a particular client user can access. The resource manager is where the actual document or a record containing a pointer to the actual document is stored, and it utilizes a variety of services for storage management. Through the client API, the end user's application program can store, search for, mark-up and delete documents associated with records in the content management system, by accessing the resource manager.

In a conventional content management system, thousands of different documents may be stored, and the documents may be related, for example an email and its attachments may be stored as separate documents, as may a master document and its embedded sub-documents, or an original document and its versions. These related documents may provide challenges to the system, as when a user deletes only one version of a document, or only one sub-document and not the other sub-documents or the master document. These actions may cause a content management system to have incomplete data, or may cause errors in which deletion is prevented of related documents.

BRIEF SUMMARY

Accordingly, embodiments of the present invention include a method of managing a deletion request for a related document in a content management system, comprising receiving a user request to delete a related document associated with a record in a content management system, searching the content management system for documents associated with the record, and if any documents are located, collecting them and determining which, if any, of the collected documents are parent documents associated with one or more child documents, removing the association between each collected document and the record, and initiating a deletion process to delete the parent documents. The embodiments further include a program product apparatus and a system for managing a deletion request as described above.

Other embodiments of the present invention include a system for managing a deletion request for a related document in a content management system, comprising a content storage manager for managing storage and deletion of documents, and for determining whether there is a relationship between two or more documents and whether there is a relationship between a document and a record, where the content storage manager is configured to receive a user request to delete a related document associated with a record, to search for and collect documents related to the record of the requested document, to determine which, if any, of the collected documents are parent documents associated with one or more child documents, to remove the association between each collected document and the record, and to initiate a deletion process to delete the parent documents.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
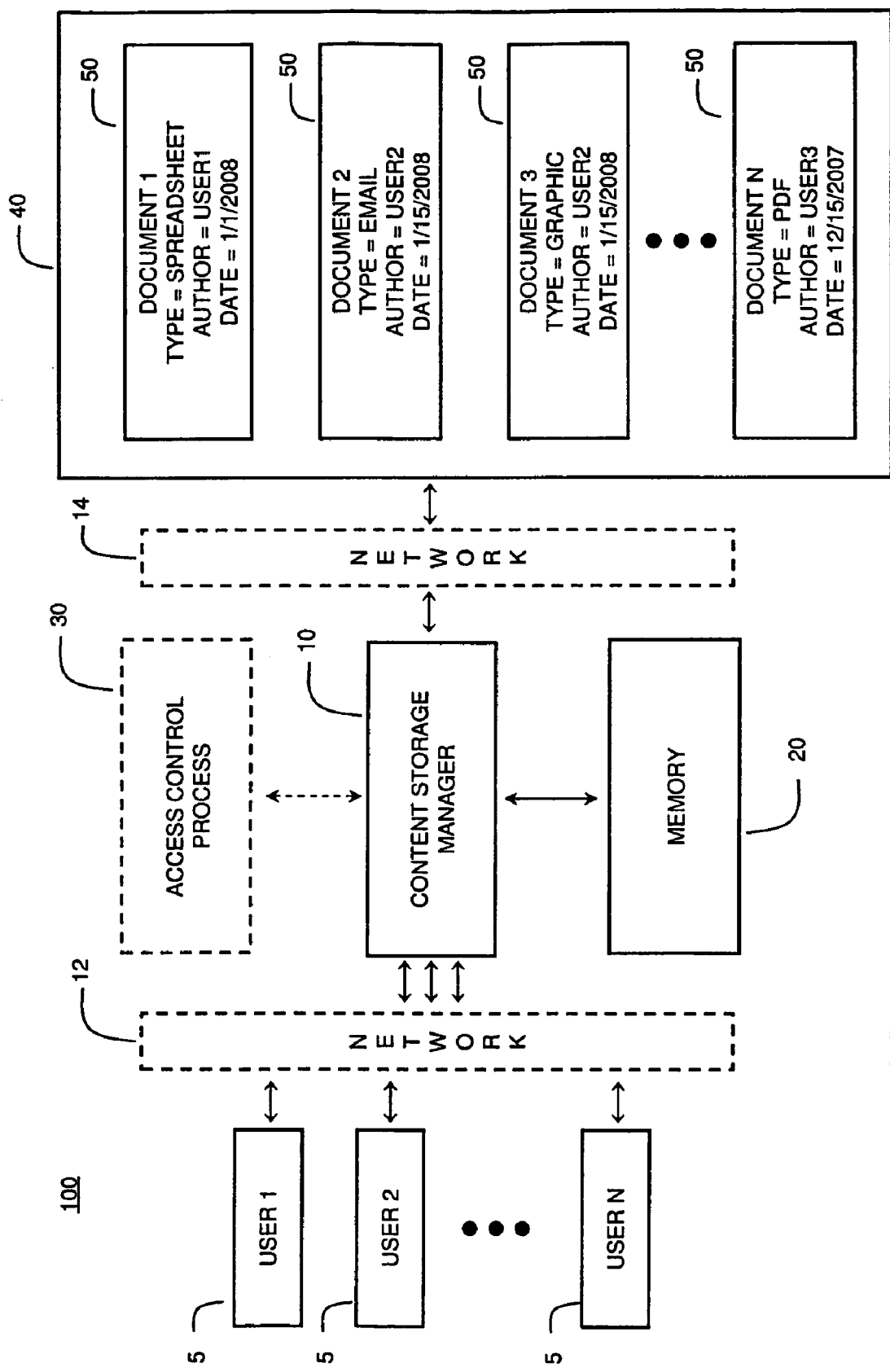
FIG. 1 is a block diagram of a system receiving content management requests from end user clients and employing related document management according to an embodiment of the present invention.

Referring now to the figures, an exemplary system employing related document management according to an embodiment of the present invention is illustrated in FIG. 1. The system shown in FIG. 1 is particularly suited to delivery of content over a network or the Internet. A content management system 100 includes a content manager process 10, associated shared or working memory 20, and one or more data storage areas 40 for storing documents 50, which are connected over networks 12, 14 to each other and to end-user clients 5. Optionally, the system may include an access control process 30, which controls access to certain documents, records, or other information based on the access privileges granted to a user. The system 100 may include additional servers, clients, and other devices not shown, and individual components of the system may occur either singly or in multiples, for example, there may be more than one data storage area in the system.

Content manager process 10 may provide an application program configured for creating, modifying, archiving, deleting or removing content managed by the system 100, and may contain tools used for publishing, format management, revision and/or access control, content indexing, and facilities for performing searches and other operations related to documents managed by the system 100. Optional access control process 30 may provide an application program configured to enable users at various authorization levels to access and manage documents stored in the system 100 in a flexible manner, for example by consulting an access control list or the metadata of the requested document before granting a user access to the document.

Content manager process 10 and optional access control process 30 may be implemented in the form of a processing system, or may be in the form of software. A processing system may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). If embodied in software, the content manager process 10 may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

Memory 20 may be implemented by any conventional or other memory or storage device (e.g., RAM, cache, flash, etc.), and may include any suitable storage capacity. Documents that an end-user is permitted to access are loaded from data storage areas 40 into memory 20, and the end-user is allowed access to the received documents. Thus, performance can be enhanced by avoiding the processing, retrieval and/or loading into memory of extraneous data.

The data storage areas 40 may be local to the content manager process 10, or remote from and in communication with the content manager process 10 via a network 14. The data storage areas 40 may be implemented by any quantity of any type of conventional or other databases (e.g., network, hierarchical, relational, object, etc.) or storage structures (e.g., files, data structures, disk or other storage, etc.). The data storage areas may store any desired information arranged in any fashion (e.g., tables, hierarchical, relations, objects, etc.), and may store additional information such as metadata in addition to documents.

Documents 50 can be any type of electronic file or data now known or later developed, such as, but not limited to HTML and XML Web content, document images, electronic records, database records, office documents, e-mail messages, textual data, printed output, electronic books, graphics, audio, video, other digital representations of information, and/or combinations thereof.

Generally, end-user client 5 provides a user interface to the functions provided by the system 100, for example, mechanisms for checking in/out a document, specifying synchronization or archiving rules, for creating, viewing, exporting and deleting documents from the system, etc. The end-user clients 5 may be implemented by any quantity of conventional or other computer systems or devices (e.g., computer terminals, personal computers (e.g., IBM-compatible, Apple MacIntosh, tablet, laptop, etc.), cellular telephone, personal data assistant (e.g., Palm Pilot, Treo, iPhone, etc.), etc.) and may include any commercially available operating system (e.g., AIX, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information.

The end-user clients 5 may be local to the content manager process 10 and data storage areas 40, or remote from and in communication with the content manager process 10 and data storage areas 40 via networks 12, 14. An Application Program Interface (API) may be used to provide access to the content manager processor 10. The end-user clients 5 may communicate with the content manager processor 10 directly, or may submit the queries to a database server.

The networks 12, 14 may be implemented by any quantity of any suitable communications media (e.g., WAN, LAN, Internet, Intranet, wired, wireless, etc.). The computer systems of the present invention embodiments (e.g., content manager processor, data storage area, end-user clients, etc.) may include any conventional or other communications devices to communicate over the networks via any conventional or other protocols, and may utilize any type of connection (e.g., wired, wireless, etc.) for access to the network.

In operation, one or more users is able to interface with the content management system through end-user client 5, which communicates with the content manager process 10, in order to make a request, for example to create, read, update, or delete a record stored in the content management system. For example, a user may request to save, either automatically or manually, a document 50 such as an email document to the content management system. This request is received by content manager process 10, which may create a record associated with the email document, and may save the email document to the data storage area 40.

As will be apparent to those skilled in the art, the document 50 to be saved may be related to one or more additional documents, for example in a parent/child relationship. The parent and child documents may be any type of documents that are typically associated with each other, for example the documents may be combined together, linked to each other, embedded within each other, and the like. The related documents may be associated in a superior/inferior relationship, for example, parent/child documents may include email/attachments, master document/subdocuments, master document/embedded documents, and the like. A parent document may be associated with one or more child documents, and a child document may be associated with one or more parent documents. For example, an email may be a parent document and attachments to the email may be child documents. Other forms of relationship between documents may exist, e.g., original version/subsequent versions of a document may be related in a non-parent/child relationship, and the like.

In the case where a relationship exists between documents to be managed by the content management system, a user may also request to save, either automatically or manually, the related documents, e.g., parent and child documents, to the content management system. For example, where the parent/child documents are an email and its attached documents, the request may be received by content manager process 10, which may detach the attachment documents from the email document so that they are saved as separate but associated documents 50 in the data storage area 40. A record associated with the email and attachment documents may also be created, and links or other pointers may be embedded in or appended to the email and attachment documents to maintain an association between the parent and its child documents. As is evident to those skilled in the art, the record and its associated documents may be stored in the same or different data storage areas 40, and in an exemplary non-limiting embodiment may be stored in different object stores.

Figure 3:
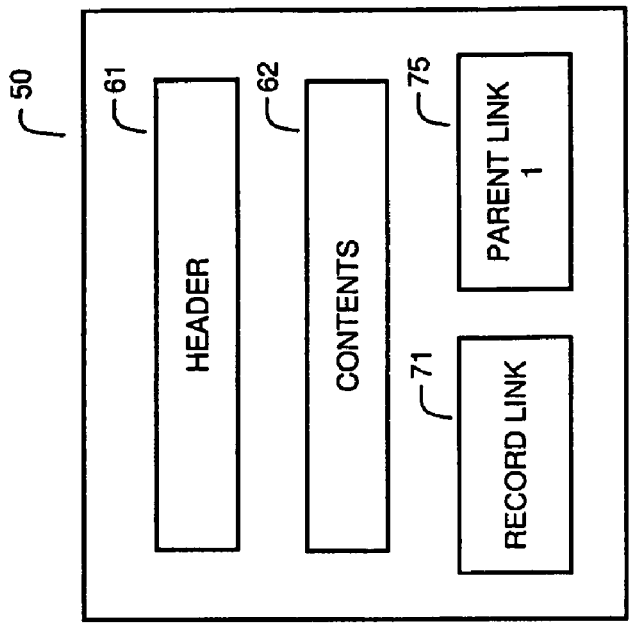
FIG. 3 is a block diagram of a child document managed according to an embodiment of the present invention.
Figure 2:
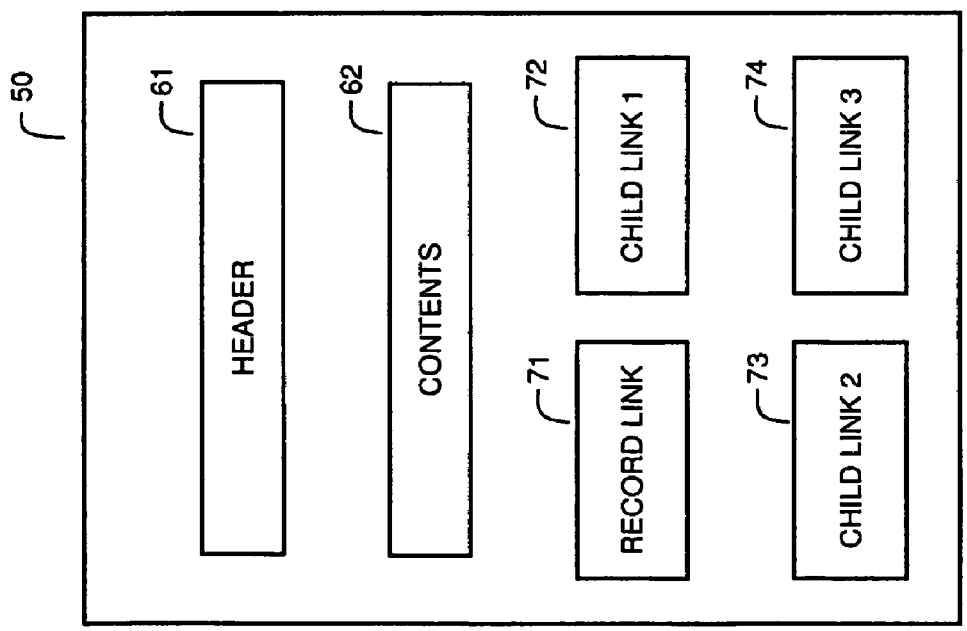
FIG. 2 is a block diagram of a parent document managed according to an embodiment of the present invention.

An exemplary parent document 50 is shown in FIG. 2, and may comprise data fields including a header 61 containing information about the contents of the document, contents 62 comprising the contents of the document, a record link 71 to the record corresponding with the parent document, and one or more child links 72, 73, 74 to child documents. As shown in FIG. 3, child document 50 also contains its own header 61 and contents 62, as well as a record link 71 to the record corresponding with the child document, and one or more parent links 75 to parent documents. A child document may be associated with more than one parent document, for example when multiple email documents have duplicate attachments, a single child document (the attachment) may be stored and linked to each parent document (the emails).

Other data fields may be used in the documents in addition to, or instead of, the exemplified data fields, for example, it may be desirable to store a message-type document (e.g., email, instant message, news groups posting, blog entry, fax message, voice message, etc.) with data fields such as message subject, message size, sender ID, recipient ID, etc. The data fields to be used may be defined in various schema, and the content manager process 10 may be configured to select a particular schema to be used with a particular type of document.

Links 71, 72, 73, 74, 75 can be configured in a variety of ways, including, for example, a text reference identifying the linked document or record and its storage location, a hyperlink or button configured to load the linked document or record in a default or user-specified program, a hyperlink or button configured to allow options such as, for example, deleting the linked document or record, moving the linked document or record to a different storage location, or otherwise suitably configured. Each link may also be configured to include information about the linked document or record, such as, for example, the name of the linked document or record, the time and/or date the linked document or record was created and/or last modified, the author of the linked document or record, and/or other information, if available. It will be understood to one skilled in the art that other configurations can also be employed.

A user working with documents may desire to delete related documents together, for example in a "cascade delete" operation. This means that when a parent document is deleted, its associated child documents are also deleted, for example when an email is deleted, its attachments are also deleted, or when a master document is deleted, all of its embedded documents are also deleted. The co-deletion or "cascade deletion" operation makes it easier for a user to delete related documents, for example by permitting a user to send a single delete request, instead of individually deleting each document, and also advantageously avoids the creation of "orphan" child documents that are not associated with any parent document.

However, when the user is working with documents stored in a content management system, the system may be configured to restrict or prevent the deletion of documents associated with a record, thus blocking a cascade delete operation. For example, the system may operate as follows: a user tries to delete a particular parent document associated with a record, the system detaches the parent document from the record (removes the link to the record), deletes the parent document, and then attempts to cascade delete the child documents. Because the child documents are still associated with a record, however, they cannot be deleted, and thus the delete request fails or is rolled-back. Similarly, a user may try to delete a particular child document associated with a record, the system detaches the child document from the record, and attempts to delete the child document. Because the child document is still associated with its parent document, however, it cannot be deleted, and thus the delete request fails or is rolled-back.

An exception process is designed to automatically handle the parent/child document situation so that cascade delete operations can be enabled. The operation of the deletion and exception processes in a content management system is described in FIGS. 4 and 5. Although the operation of the processes is described with respect to email and attachments generally, it is understood to one skilled in the art that the processes can be used with any parent/child document grouping, and is not limited to email and attachments. Generally, the steps of the methods described in FIGS. 4 and 5 are performed by the content storage manager 10 of FIG. 1.

Figure 4:
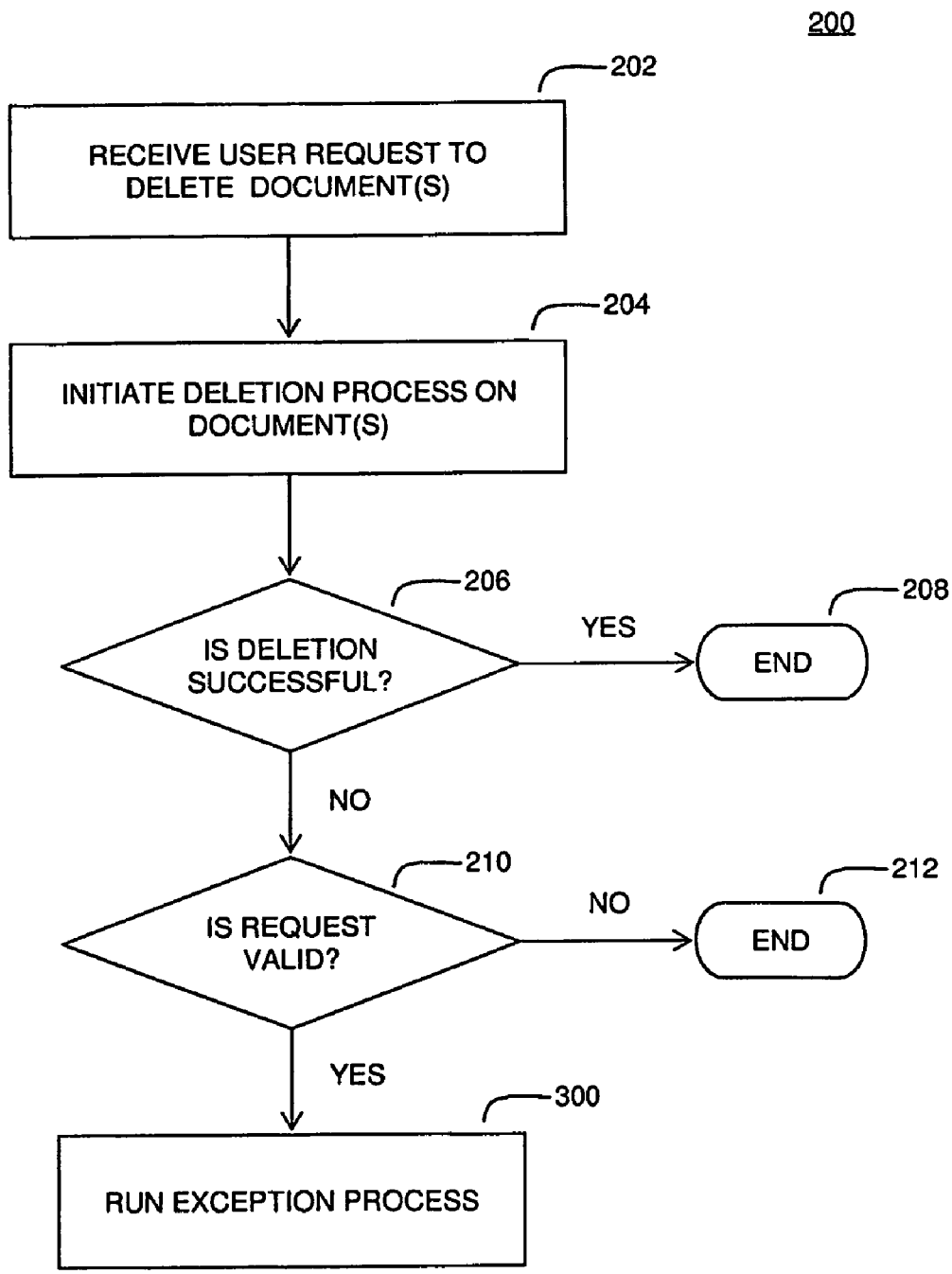
FIG. 4 is a procedural flow chart illustrating the manner in which a deletion request for a particular document is managed according to an embodiment of the present invention.

Referring now to FIG. 4, the reference numeral 200 generally designates a flow chart depicting a method for managing a deletion request for a particular document in a content management system. Step 202 receives a user request to delete a document or documents, and initiates a deletion process on the document(s) at step 204. For example, the deletion process may remove the link associating each document with its corresponding record, so that the document(s) can be deleted from the content management system. At decisional step 206, a determination is made whether the document or documents have been deleted successfully. If the deletion process has successfully deleted the document(s), the process continues along the YES branch to step 208 wherein the deletion process ends, and wherein a message may be provided to the user indicating the success of the request.

If at decisional step 206 the deletion process has not successfully deleted the document(s), the process continues along the NO branch to decisional step 210, where a determination is made whether the deletion request is valid. If the request is invalid, the process continues along the NO branch to step 212 wherein the deletion process ends, and wherein an error message may be provided to the user indicating the failure of the request. The request may be invalid for numerous reasons, which may vary depending on the configuration of the content management system, and which may include that the record has a hold flag indicating that it should not be altered or its documents deleted, or that the user lacks access permission to delete a record or document. If at decisional step 210 the request is determined to be valid, and the deletion process is determined to have been blocked because another document or record is associated with the document to be deleted and preventing the deletion thereof, then the process continues along the YES branch to the exception process 300.

Figure 5:
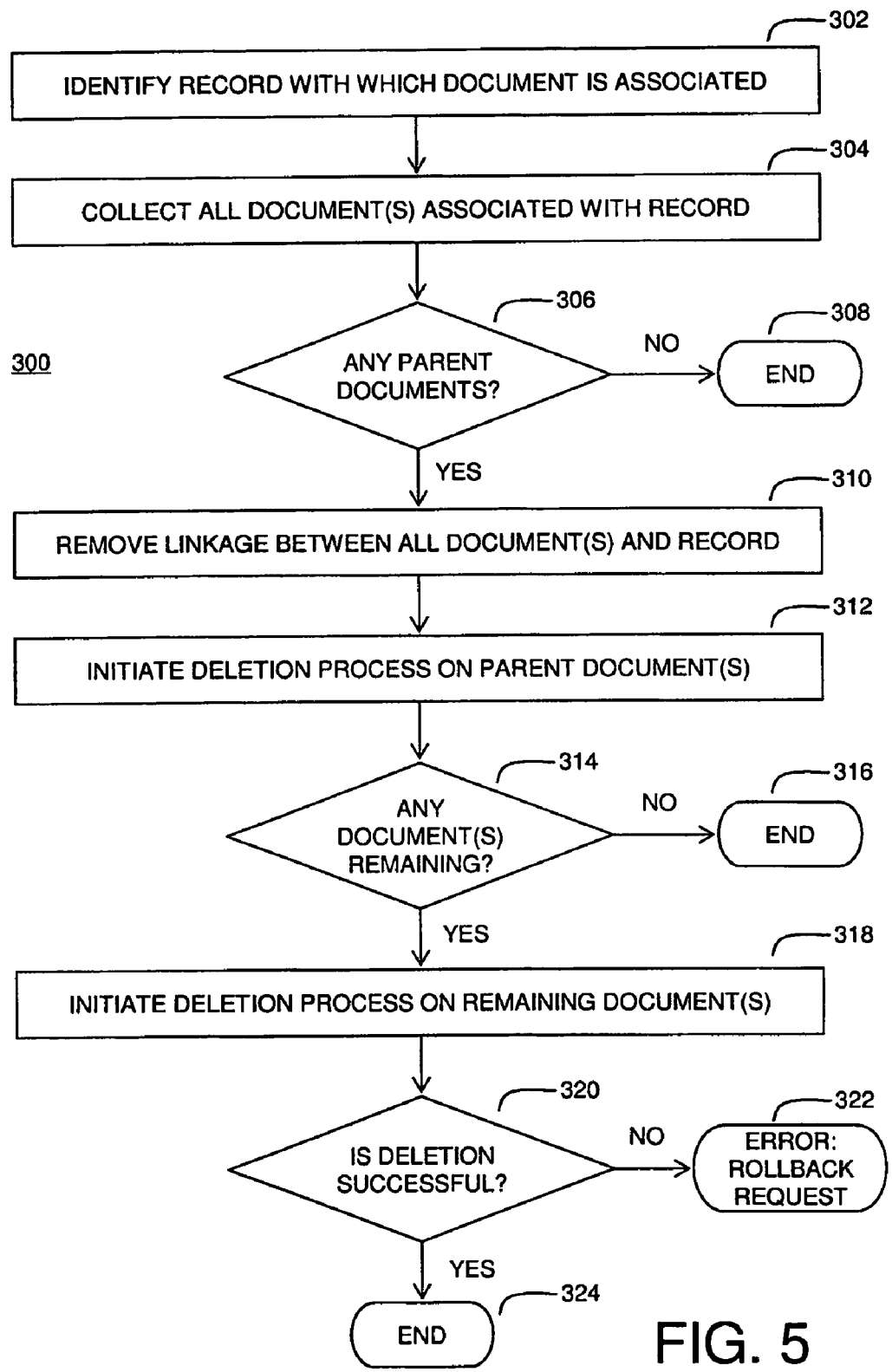
FIG. 5 is a procedural flow chart illustrating the manner in which an exception process for implementing a deletion request for a particular document is managed according to an embodiment of the present invention.

Referring now to FIG. 5, the reference numeral 300 generally designates a flow chart depicting an exemplary exception process for managing the implementation of a deletion request for a particular record. Step 302 identifies the record with which the document to be deleted is associated, and step 304 searches for and collects all of the documents associated with the record, for example by creating a temporary table listing the documents. The search may, for example, comprise a search to find links of a record type, or may involve examining an enumerated list of documents in the record. At decisional step 306, a determination is made whether any of the documents are parent documents, for example by searching a link table in the database storing the documents to find links of a parent type. If none of the documents associated with the record are parent documents, then the exception process is not the appropriate process to resolve the deletion request, and the process continues along the NO branch to step 308 wherein the exception process ends. At step 308 an error message may be provided to the user indicating the failure of the deletion request.

If at decisional step 306 it is determined that one or more of the documents associated with the record are parent documents, then the process continues to step 310. At step 310, the process removes the link associating each document collected in step 304 with the record. The content management system may be configured so that there is a reciprocal relationship between the record and the document, instantiated from the document side, e.g., the document chooses to attach/detach from a record by setting an object value property, and the record referred to, in return, associates itself with the document. If the value of the object (e.g., a record link 71) is set to null on the document side, the document detaches itself from the record, and the record reciprocates.

Step 312 initiates a deletion process on collected parent documents, which then prompts a cascade deletion of the child documents associated with the deleted parent document(s). At decisional step 314, a determination is made whether any documents remain undeleted, for example because there are non-related documents associated with the record, or because a particular child document has another parent document associated with a different record in the system. If no documents remain, the process continues along the YES branch to step 316 wherein the exception process ends, and wherein a message may be provided to the user indicating the success of the deletion request.

If at decisional step 314 one or more documents remain undeleted, the process continues along the NO branch to step 318, where a deletion process is initiated on the remaining document(s). At decisional step 320, a determination is made whether the remaining document(s) have been deleted successfully. If the deletion process has not successfully deleted the document(s), the process continues along the NO branch to decisional step 322, wherein the exception process ends, the deletion request is rolled-back, and wherein an error message may be provided to the user indicating the failure of the request. If the deletion process has successfully deleted the document(s), the process continues along the YES branch to step 324 wherein the exception process ends, and wherein a message may be provided to the user indicating the success of the request.

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C++, Python, Java, or PHP programming languages, data storage may be implemented in MySQL, Oracle, SQL Server, IBM DB2, Informix or a flat database, etc. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention may be distributed in any manner among the content management system, resource managers, and end-user systems. The software and/or algorithms described above and illustrated in the flow charts may be modified in any manner that accomplishes the functions described herein. In addition, the functions in the flow charts or description may be performed in any order that accomplishes a desired operation.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The software may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the content management processing system to become coupled to other processing systems or remote printers or storage devices through intervening private or public networks. Modems, cable modem and Ethernet cards are just a few of the currently available types of network adapters.

It will be appreciated that the embodiments described above and illustrated in the drawings represent only a few of the many ways of implementing remote control of storage management services in a content management system. Having described preferred embodiments of a new and improved content management system, and method for remotely controlling storage management services of resource managers in such a system, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of managing a deletion request for a related document in a content management system, comprising:
    receiving a user request to delete a related document that is associated with a record and stored in a memory in a content management system;

initiating a first deletion process to delete the related document from the memory; and if said first deletion process is unsuccessful, performing an exception process comprising:
(a) searching the content management system for documents associated with the record, collecting any documents located by the search, and determining if any of the collected documents are parent documents associated with one or more child documents, wherein if none of the collected documents are parent documents, then the exception process is rolled-back and the user request is denied;
(b) removing the association between each collected document and the record; and
(c) initiating a second deletion process to delete the collected documents from the content management system, wherein if the second deletion process is unsuccessful, then the exception process is rolled-back and the user request is denied.

2. The method according to claim 1, wherein at least one of the steps is implemented on a computer system.

3. The method according to claim 1, wherein the requested related document is a parent document containing a link to one or more child documents.

4. The method according to claim 3, wherein the requested related document is a message-type document selected from the group consisting of an email, an instant message, a news groups posting, a blog entry, a fax message, and a voice message.

5. The method according to claim 3, wherein the requested related document is an email, and the child documents are attachments to the email.

6. The method according to claim 1, wherein the requested related document is a child document containing a link to one or more parent documents.

7. The method according to claim 6, wherein the requested related document is an attachment, and at least one of said one or more parent documents is an email.

8. The method according to claim 1, wherein said searching step comprises searching to find links of a record type, and wherein each document associated with the record has a link to the record.

9. The method according to claim 8, wherein said removing step comprises, for each collected document associated with the record, deleting the link to the record.

10. The method according to claim 1, wherein said determining step comprises searching a link table in the content management system to find links of a parent type.

11. The method according to claim 1, further comprising, in response to said initiation of a second deletion process step, performing a cascade deletion of the one or more child documents associated with said parent documents.

12. The method according to claim 1, further comprising transmitting a notification message in response to the user request if none of the collected documents are parent documents.

13. A computer program product comprising a computer useable memory device having a computer readable program stored thereon, wherein the computer readable program when executed on a computer causes the computer to:

receive a user request to delete a related document that is associated with a record and stored in a memory in a content management system;

initiate a first deletion process to delete the related document from the memory; and if said first deletion process is unsuccessful, perform an exception process comprising:

(a) searching the content management system for documents associated with the record, collecting any documents located by the search and determining if any of the collected documents are parent documents associated with one or more child documents, wherein if none of the collected documents are parent documents, then the exception process is rolled-back and the user request is denied;
(b) removing the association between each collected document and the record; and
(c) initiating a second deletion process to delete the collected documents from the content management system, wherein if the second deletion process is unsuccessful, then the exception process is rolled-back and the user request is denied.

14. The computer program product of claim 13, wherein the requested related document is a parent document containing links to one or more child documents, or a child document containing a link to one or more parent documents.

15. The computer program product of claim 14, wherein at least one parent document is a message-type document selected from the group consisting of an email, an instant message, a news groups posting, a blog entry, a fax message, and a voice message.

16. The computer program product of claim 15, wherein at least one parent document is an email, and the one or more child documents are attachments to the email.

17. The computer program product of claim 13, wherein said determination comprises searching a link table in the content management system to find links of a parent type.

18. The computer program product of claim 13, further comprising, in response to said initiation of a second deletion process, performing a cascade deletion of the one or more child documents associated with said parent documents.

19. The computer program product of claim 13, further comprising transmitting a notification message in response to the user request if none of the collected documents are parent documents.

20. A system for managing a deletion request for a related document in a content management system, comprising:

a memory having a plurality of documents stored therein, wherein each document is associated with a record; and a content storage manager for managing storage and deletion of documents stored in the memory, and for determining whether there is a relationship between two or more documents and whether there is an association between a document and a record, wherein the content storage manager is configured with logic to:

receive a user request to delete a first document stored in the memory and associated with a first record, initiate a first deletion process to delete the first document from the memory, and if said first deletion process is unsuccessful, perform an exception process comprising:

(a) searching for and collecting documents associated with the first record, determining if any of the collected documents are parent documents associated with one or more child documents, wherein if none of the collected documents are parent documents, then the exception process is rolled-back and the user request is denied,
(b) removing the association between each collected document and the first record, and
(c) initiating a second deletion process to delete the collected documents,
wherein if the second deletion process is unsuccessful, then the exception process is rolled-back and the user request is denied.

21. The system of claim 20, stored on a storage medium such as a hard disk, a CD or DVD, or to be transmitted by means of an electric carrier signal over a computer network.

22. The system of claim 20, wherein the content storage manager is further configured to, in response to said initiation of the second deletion process, perform a cascade deletion of the one or more child documents associated with said parent documents.

23. The system of claim 20, wherein the content storage manager is further configured to transmit a notification message in response to the user request if none of the collected documents are parent documents.

* * * * *